A. L. McGREGOR.
BUMPER ATTACHING BRACKET.
APPLICATION FILED MAR. 24, 1920.
1,359,185.
Patented Nov. 16, 1920.
2 SHEETS—SHEET 1.
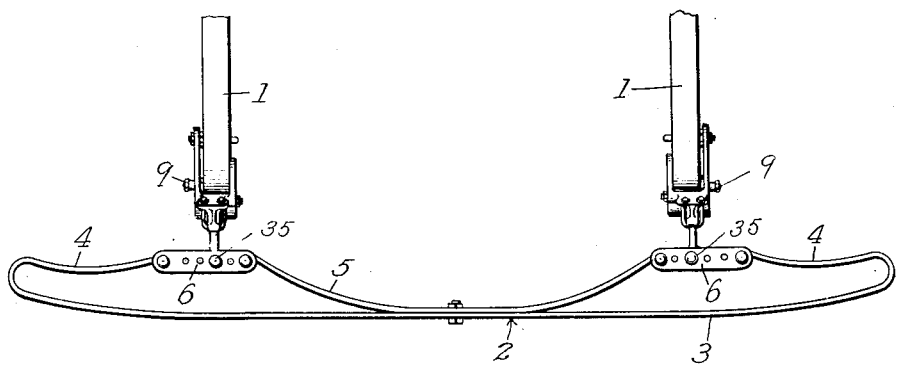
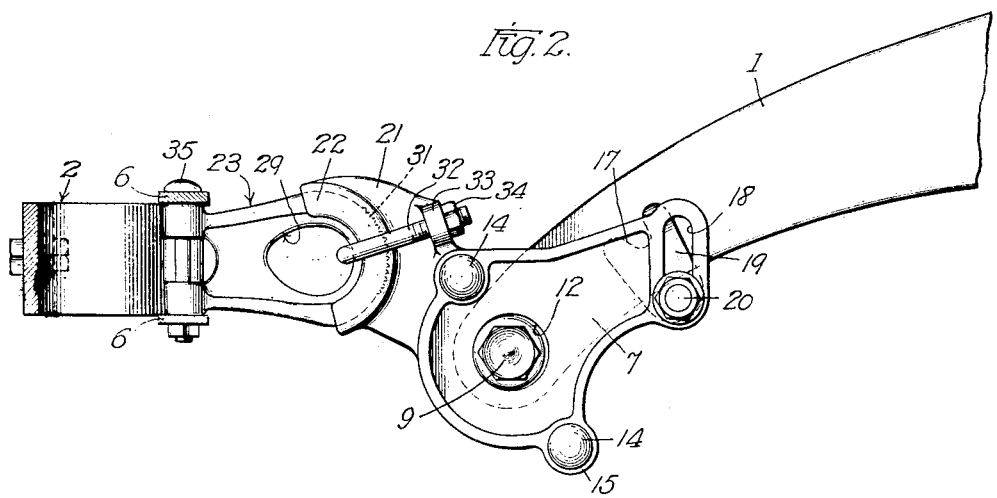
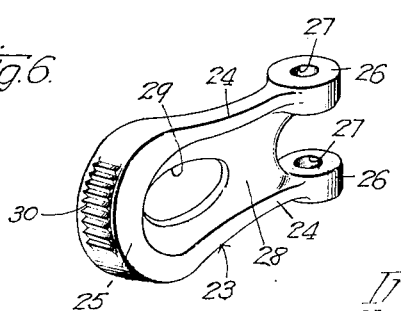
Inventor
Allan L. McGregor

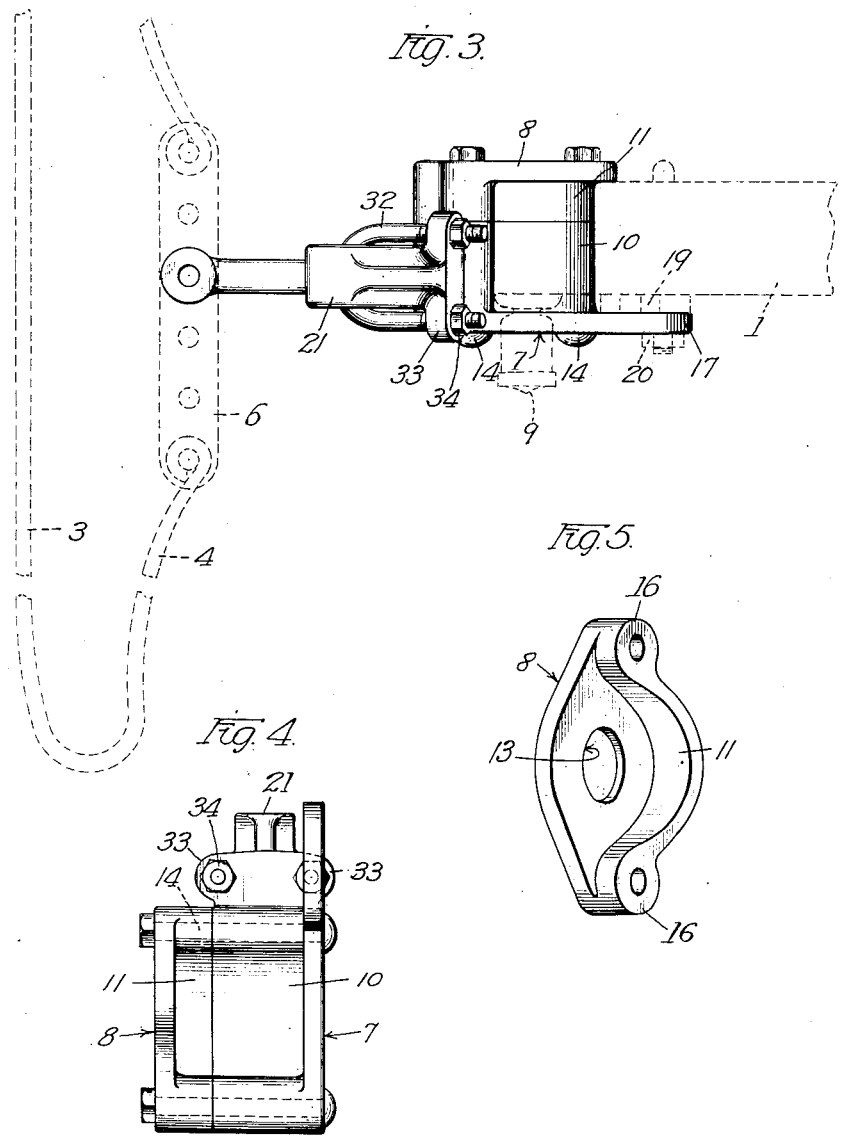

UNITED STATES PATENT OFFICE.

ALLAN L. McGREGOR, OF CHICAGO, ILLINOIS.

BUMPER-ATTACHING BRACKET.

1,359,185.	Specification of Letters Patent.	Patented Nov. 16, 1920.

Application filed March 24, 1920. Serial No. 368,467.

*To all whom it may concern:*

Be it known that I, ALLAN L. MCGREGOR, a citizen of the United States, and a resident of Chicago, in the county of Cook and State of Illinois, have invented certain new and useful Improvements in Bumper-Attaching Brackets, of which the following is a specification.

This invention relates to improvements in automobile bumpers, and more particularly to the brackets employed for attaching the impact member or bar of the bumper to the frame of the motor vehicle.

The object of the invention is to provide a construction for an attachment bracket having certain novel features calculated to permit its use and application upon vehicles having various size and dimensions throughout those parts to which the bumper is ordinarily attached; to provide a construction having sufficiently rugged construction to resist the shocks of impact received by the bumper, without breakage of its parts or those to which it is connected, and to provide a structure having a desirable degree of adjustability to permit the same to be properly attached to various makes of vehicles, to compensate for the vertical adjustment of the impact member with relation to the vehicle frame, and to otherwise provide for the proper positioning of all parts of the bumper structure.

The features of my invention are hereinafter more specifically set forth, and in connection with the accompanying drawings, in which—

Figure 1 is a top plan view of the bumper attached to the frame members of the vehicle, and showing the bracket embodying the features of the invention, Fig. 2 is an enlarged view in side elevation of the attaching bracket, a portion of the vehicle frame member to which it is attached, and the impact member of the bumper in cross section.

Fig. 3 is an enlarged plan view of the attaching bracket with portions of the vehicle frame member and impact member in dotted line, Fig. 4 is a rear view in elevation of the attaching bracket removed from the vehicle frame, and parts thereof assembled, Fig. 5 is a perspective view of one of the plates of the attaching bracket, and Fig. 6 is a perspective view of the yoke or clevis forming a part of the attaching bracket.

The attaching bracket embodying the features of the invention is ordinarily mounted at the forward or rear ends of the longitudinal frame members 1—1 of the motor vehicle, and support a bumper impact member 2 beyond the ends of said frame members 1—1, and extending transversely thereof. Although I have illustrated in Fig. 1 a particular type of impact member, any suitable construction may be employed for this portion of the bumper having suitable members for connecting the same to the attaching brackets. The type of bumper illustrated is formed of resilient bar material, bent to provide a forward impact bar 3 having its ends formed in U-shape to provide rearwardly disposed end portions 4—4. A reinforcing member 5 is connected to the central portion of the front impact bar 3 and extends laterally and rearwardly from said central portion, and having its free ends connected to the ends of the end portions 4—4 by means of links 6—6, said links being directly connected to the bracket as hereinafter more fully set forth.

A bracket constructed in accordance with the invention comprises in general two plates 7 and 8 adapted to be applied on opposite sides of the frame member 1, and at the extreme end thereof, said plates being largely connected to the frame member 1 and supported therefrom by means of a transverse pivot bolt 9, ordinarily employed at the end of the frame member for joining said frame member with a spring lying immediately below the frame member, and of the usual leaf type. The plate 7 which is preferably applied to the outer side of the frame member 1 is semi-circular throughout its forward portion, and is provided with an inwardly extending marginal flange 10 extending inwardly and abutting against a companion flange 11 formed integral with the opposite or inner plate 8, the latter plate having a similar semi-circular portion throughout its forward portion. These flanges 10 and 11 are spaced radially from circular apertures or bolt holts 12 and 13 formed in the plates 7 and 8, and through which the pivot bolt 9 extends, there being sufficient distance between the bolt holes and the flanges to provide ample room for the end portion of the frame member 1. The plates 7 and 8 are further connected together by means of two bolts 14—14 extending through bolt holes formed in integral bosses 15 and 16 located at diametrically opposed points on the upper and lower margins of plates 7 and 8 respectively. Rearwardly of the bolt hole 13 the inner plate 8 terminates in a somewhat semi-circular margin, as clearly shown in Fig. 5, whereas the outer plate 7 is provided with a rearwardly extending arm 17, at the end of which is formed a vertically arranged slot 18. A suitable clamping bolt 19 engaging the frame member 1 at a suitable distance rearwardly of the pivot bolt 9, extends through the slot 18 of the plate 7 and is secured thereto by means of a nut 20.

Integral with the outer plate 7 and extending forwardly from the upper side thereof is another arm 21, the same being provided with a forwardly facing semi-circular portion 22 having a similarly shaped groove extending vertically throughout the same. This grooved portion 22 which partakes of the nature of a semi-circular depression is adapted to retain therein a yoke member or clevis 23, this member consisting of two substantially parallel arms 24—24 joined together at one of their ends by a semi-circular portion 25 and terminating at their free ends in bosses 26—26, provided with holes 27—27 arranged in vertical alinement with each other. The space between the arms 24—24 is preferably closed by a web 28, in which an opening 29 is formed adjacent to the connecting portion 25. On the outer curvilinear surface of the connecting portion 25 is formed a plurality of teeth 30. The yoke member 23 is connected to the arm 21 of the plate 7 by inserting the semi-circular connecting portion 25 within the semi-circular depressed portion 22 of said arm 21, there being provided throughout the inner surface of the depressed portion 22 a series of teeth 31 similar to the teeth 30 of the yoke member 23, and adapted to have interlocking connection therewith. By reason of the interlocking teeth, the relative positions of the yoke 23 and the plate 7 may be adjusted, by rotating the yoke member 23 in a vertical plane about the imaginary center of the semi-circular connecting portion 25, by disengaging the teeth 30 and 31 sufficiently to permit the relative movement between the parts, and then by means of a U bolt 32 the yoke member is permanently locked in adjusted position. The U bolt 32 passes through the opening 29 in the web 28 of the yoke member, its parallel portions extending rearwardly and through holes formed in bosses 33—33 extending laterally from opposite sides of the arm 21. Nuts 34—34 have screw threaded engagement with the ends of the U-bolt and serve to connect the parts together in the usual manner.

The outer end of the yoke member 23 extends between the links 6—6 of the impact member 2, and is connected thereto by means of a bolt 35 extending through the links and the holes 27—27 of the bosses 26—26.

From the description of the parts making up the bracket, it will be seen that the plates are so formed as to constitute a box like structure which fits over and incloses the forward end of the frame member 1, there being ample space separating the frame member and the surrounding structure to permit the necessary and desirable degree of adjustment, at the same time avoiding direct contact between the frame member 1 and the walls of this box like structure. By the provision of the bolts 14—14, the plates 7 and 8 are connected together independently of the pivot bolt 9, thus the rigid box like structure referred to is obtained without reliance upon the pivot bolt 9 which serves only to secure the surrounding portion of the bracket to the frame member. Manifestly, the bracket is free to be rotated by the pivot bolt, thereby affording a sufficient degree of vertical adjustment, prior to the tightening of the pivot bolt 9 and the application of the clamping bolt 19. The amount of vertical adjustment obtained by rotating the box like structure composed of the plates 7 and 8, must necessarily be limited to a predetermined extent, and between which limits the same may be secured by the tightening of the pivot bolt, the application of the clamping bolt 19 and the final tightening of the nut 20. Additional adjustment in the vertical plane is obtained by the relative movement or adjustment between the arm 21 of the plate 7 and the yoke member 23, this being accomplished by the loosening of the U bolt 32, and the rotative adjustment of the clevis 23 to such extent as will properly position the impact member 2 of the bumper.

By reason of the structure herein described and illustrated, a desirable bracket for connecting a bumper to practically all makes of vehicles may be produced, in that ample provision for lateral adjustment, as well as vertical adjustment is made, so that a bumper may be attached with little difficulty, and labor, and be properly positioned as regards its vertical relation to the ground.

Although I have described and illustrated a preferred structure embodying the features of my invention, it is manifest that it may be variously modified as to its details of construction without departing from the spirit of the invention, and therefore I do not wish to be limited except in so far as the invention is specifically set forth in the appended claims.

I claim as my invention:

1. In a bumper attaching bracket, the combination with a vehicle frame member and an impact member, of a plate adapted to be fixed to the end of said frame member, a yoke member adapted for connection with said impact member and vertically adjustable connection with said plate, and means for securing said yoke and plate together in several positions of adjustment.

2. In a bumper attaching bracket, the combination with a vehicle frame member and an impact member, of a plate adapted to be fixed to the end of said frame member, a yoke member adapted for connection with said impact member, and vertically angular adjustment with said plate through the medium of interfitting radial bearing surfaces, and means for locking said yoke and plate together in several positions of angular adjustment.

3. In a bumper attaching bracket, the combination with a vehicle frame member and an impact member, of a plate adapted to be fixed to the end of said frame member, a yoke member adapted for connection with said impact member, and vertically angular adjustment with said plate through the medium of interfitting radial bearing surfaces provided with interlocking notches and means for locking said yoke and plate together in several positions of angular adjustment.

4. In a bumper attaching bracket, the combination with a vehicle frame member having a pivot bolt at the end thereof, of a plate adapted to be clamped to said frame member by means of said pivot bolt, means for adjusting said plate angularly about said bolt, and a yoke member adapted for connection with a bumper impact member, and having vertically adjustable connection with said plate.

5. In a bumper attaching bracket, the combination with a vehicle frame member having a pivot bolt at the end thereof, of a plate adapted to be clamped to said frame member by means of said pivot bolt, adjustable connecting means radially offset from said bolt for locking said plate to said frame member in several positions of angular adjustment, and a member intermediate the bumper impact member and said plate, and having adjustable connection with said plate.

6. In a bumper attaching bracket, the combination with a vehicle frame member having a pivot bolt at the end thereof, of companion plates clamped on either side of said frame member by means of said pivot bolt, one of said plates being provided with transverse marginal flanges abutting against the other plate thereby forming a box-like structure substantially surrounding the end of said frame member, and means for securing said structure in several positions of angular adjustment relative to said pivot bolt.

7. In a bumper attaching bracket, the combination with a vehicle frame member having a pivot bolt at the end thereof, of companion plates clamped on either side of said frame member by means of said pivot bolt, said plates being provided with abutting marginal flanges, thereby forming a box-like structure substantially surrounding the end of said frame member, one of said plates having adjustable connection with said frame at a point radially offset from said bolt, and means for locking said plate in several positions of angular adjustment.

8. In a bumper bracket, the combination with a vehicle frame member having a pivot bolt at the end thereof, of companion plates clamped on opposite sides of said frame member by means of said pivot bolt, said plates being bolted together and provided with abutting marginal flanges, thereby forming a box-like structure inclosing the end of said frame member, means for effecting the angular adjustment of said plates about said pivot bolt, and an intermediate yoke member connected to a bumper impact member, and having vertically adjustable connection with said box-like structure.

In witness whereof I hereunto subscribe my name this 20th day of March, A. D. 1920.

ALLAN L. McGREGOR.